United States Patent
Binotto et al.

(10) Patent No.: US 8,127,316 B1
(45) Date of Patent: Feb. 28, 2012

(54) SYSTEM AND METHOD FOR INTERCEPTING PROCESS CREATION EVENTS

(75) Inventors: Alessandro Binotto, Kanata (CA); Anton Gostev, Altayskaya (RU); Ivan Sergeevich Andreyev, Saint Petersburg (RU); Agafonov Artyom, Saint Petersburg (RU)

(73) Assignee: Quest Software, Inc., Aliso Viejo, CA (US)

( * ) Notice: Subject to any disclaimer, the term of this patent is extended or adjusted under 35 U.S.C. 154(b) by 1125 days.

(21) Appl. No.: 11/947,695

(22) Filed: Nov. 29, 2007

(51) Int. Cl.
*G06F 3/00* (2006.01)
(52) U.S. Cl. ........................ 719/331; 719/332
(58) Field of Classification Search ............... 719/331, 719/332
See application file for complete search history.

(56) References Cited

U.S. PATENT DOCUMENTS

| | | | | |
|---|---|---|---|---|
| 5,764,985 | A * | 6/1998 | Smale | 719/328 |
| 6,529,985 | B1 * | 3/2003 | Deianov et al. | 710/260 |
| 6,823,460 | B1 * | 11/2004 | Hollander et al. | 726/3 |
| 7,171,337 | B2 * | 1/2007 | Yuan et al. | 702/185 |
| 7,234,137 | B2 * | 6/2007 | Taylor et al. | 717/167 |
| 7,519,596 | B2 * | 4/2009 | Iyer et al. | 1/1 |
| 7,685,638 | B1 * | 3/2010 | Buches | 726/22 |
| 2008/0162730 | A1 * | 7/2008 | Goyal | 709/249 |

OTHER PUBLICATIONS

Lianyu Chu, Evaluation of Potential ITS Strategies under Non-Recurrent Congestion Using Microscopic Simulation, 2003.*
Quest Software, "Quest Group Policy Extensions for Desktops" Product Overview, Version 2.0. Updated Sep. 22, 2005.
Mar-Elia, Darren. "Bulletproof Your Windows Network with Group Policy". Quest Software, updated Jun. 10, 2006.

* cited by examiner

*Primary Examiner* — Lechi Truong
(74) *Attorney, Agent, or Firm* — Knobbe Martens Olson & Bear LLP

(57) ABSTRACT

A system for detecting creation of a program instance includes an interceptor routine that obtains a parameter corresponding to a characteristic of a program instance and an interceptor module that can be injected into a native operating system process. In certain examples, the interceptor module can replace an address of a selected routine in an address table with an address to the interceptor routine, such that the native operating system process can call the interceptor routine in place of the selected routine. Additionally, the system can include a comparison module that compares the parameter to a set of identified programs to determine whether the program instance corresponds to at least one of the identified programs. The system can also include a security module that can modify execution of the program instance based at least in part on a determination that the program instance corresponds to at least one identified program.

27 Claims, 7 Drawing Sheets

SYSTEM AND METHOD FOR INTERCEPTING PROCESS CREATION EVENTS

RELATED APPLICATION

This application claims priority from U.S. Provisional Application No. 60/872,034 filed Nov. 30, 2006, entitled "System and Method for Intercepting Process Creation Events," which is hereby incorporated herein by reference in its entirety.

BACKGROUND

1. Technical Field

Certain embodiments of this disclosure relate to detecting an instance of a program.

2. Description of the Related Technology

Even with increased interest and focus on security and the efforts of organizations to thwart external threats to critical systems, much of Information Technology (IT) security breaches and identity thefts occur behind an organization's firewall. When a user or administrator logs on with access rights, as many applications require, any program that is running—including web browsers, e-mail clients, and instant messaging programs—may also have system access. This system access can allow malicious software to manipulate services such as antivirus programs without detection by the operating system.

It therefore can be desirable to control users' access rights to certain programs. On some operating systems, however, such as certain versions of Microsoft Windows®, it can be difficult or impossible to control access to a customized set of programs. The reason for this lack of control is based at least in part on Windows'® user account system. Windows® provides administrator and non-administrator accounts. Users who have administrative privileges can generally access most or all programs on a computer. Non-administrators cannot install many types of programs, and many programs will not run in non-administrator mode. As a result, non-administrator accounts can be more secure than administrator accounts. However, options for configuring individual program access on non-administrator accounts can be limited or cumbersome to use. Making users non-administrators to improve security may therefore not be feasible.

SUMMARY OF SOME EMBODIMENTS

To provide more control over which programs users can access and for other purposes, systems and methods are provided herein for detecting an instance of a program. When a program instance is created, at least one process, thread, fiber, or the like may be created. Detecting the creation of a program instance can facilitate controlling access to or execution of the program instance.

Thus, in certain embodiments, a computer-implemented method of detecting creation of processes includes injecting an interceptor module into a native operating system process and replacing, with the interceptor module, an address of a selected routine in an address table with an address to an interceptor routine of the interceptor module such that the native operating system process calls the interceptor routine in place of the selected routine during a creation of a second process. The method also includes obtaining at least one parameter from the native operating system process using the interceptor routine, wherein the at least one parameter corresponds to at least one characteristic of the second process. Additionally, the method includes analyzing the parameter to determine whether the second process corresponds to a program of interest and controlling the second process in response to determining that the process corresponds to the program of interest.

In various embodiments, a system for detecting the creation of a program instance includes an interceptor routine that obtains a parameter corresponding to a characteristic of a program instance and an interceptor module that is injected into a native operating system process. In certain examples, the interceptor module replaces an address of a selected routine in an address table with an address to the interceptor routine, such that the native operating system process calls the interceptor routine in place of the selected routine. Additionally, the system includes a comparison module that compares the parameter to a set of identified programs to determine whether the program instance corresponds to at least one of the identified programs. The system also includes a security module that modifies execution of the program instance based at least in part on a determination that the program instance corresponds to at least one identified program.

For purposes of summarizing the disclosure, certain aspects, advantages and novel features of the inventions have been described herein. It is to be understood that not necessarily all such advantages may be achieved in accordance with any particular embodiment of the inventions. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Specific embodiments will now be described with reference to the drawings, which are intended to illustrate and not limit the various features of the disclosure.

DETAILED DESCRIPTION OF SOME EMBODIMENTS

Figure 1:
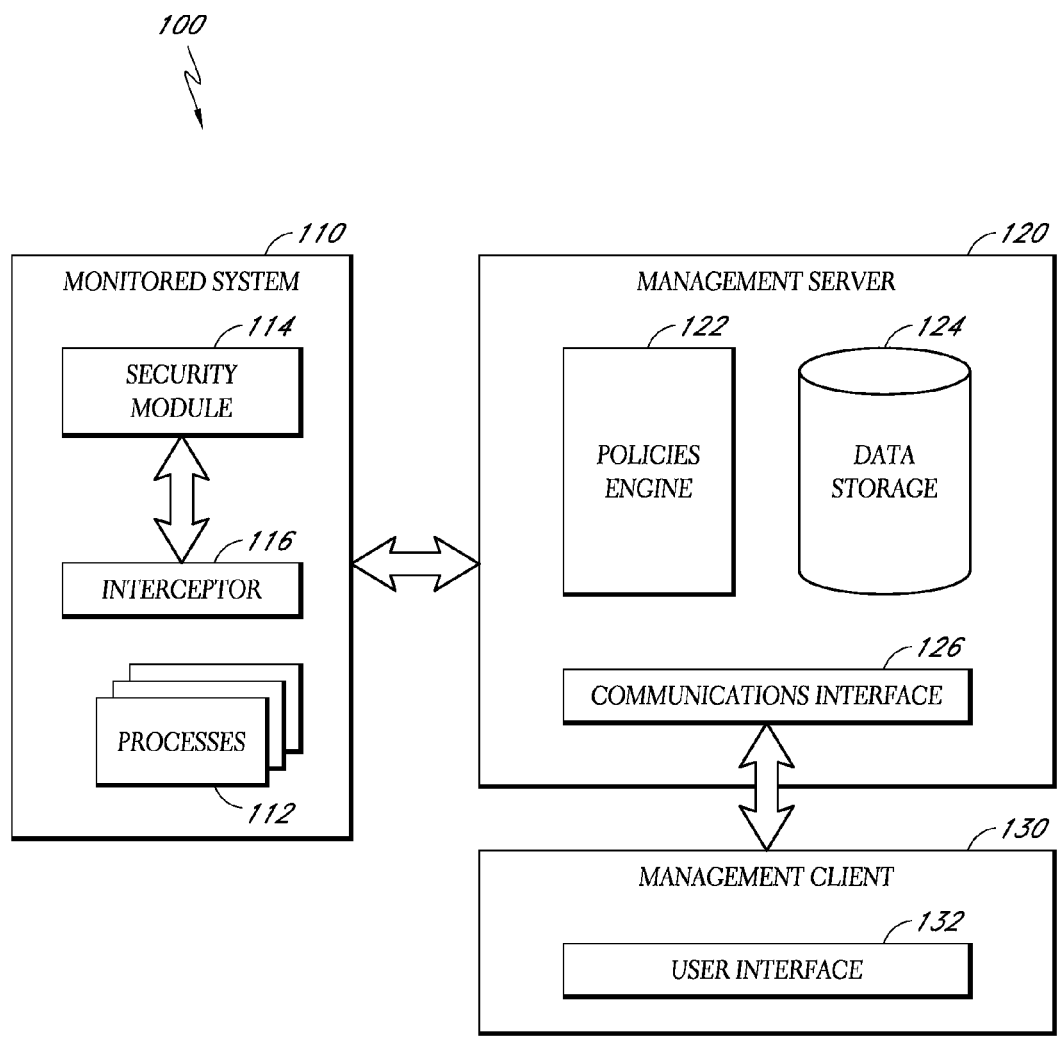
FIG. 1 illustrates an embodiment of a security system for securing one or more monitored systems.

Several different computer-implemented methods and systems will now be described for detecting the creation of processes, threads, fibers, or the like. More generally, methods and systems described herein can detect a program instance, which can include one or more processes, threads, fibers, combinations of the same, or the like. For convenience, the remainder of this disclosure will refer to detecting process creation events and/or controlling processes. However, it will be understood that other program instances, such as threads, fibers, combinations of the same, and the like can also be detected and/or controlled using certain embodiments of the methods and systems described.

The methods described herein may be embodied individually or in any combination in a computer system ("system"), which can include a desktop computer, a handheld computer (e.g., a personal digital assistant (PDA), smart phone, or the like), a server, a laptop, a workstation, combinations of the same, and the like. For purposes of illustration, the methods and systems herein are primarily described in the context of the Microsoft Windows® operating system, including but not limited to Windows NT®, Windows 2000®, Windows XP®, Windows Vista®, Windows® CE, Windows Mobile®, Windows Server®, and the like (collectively, "Windows*"). However, the methods and systems described herein can be used with other operating systems in certain embodiments, including but not limited to UNIX and UNIX-like operating systems, Linux®, Mac OS®, Mac OS X®, and the like.

A significant deficiency in existing computer systems is a lack of solutions for effectively detecting processes, and in particular, for detecting process creation events. In Windows®, one method of detecting process creation events is to use a device driver that detects process creation in the kernel mode (e.g., low-level operating system mode). This method is disadvantageous because, among other reasons, device driver failure can result in crashing the operating system.

Another method of detecting process creation is patching the service dispatch table (SDT) function in the kernel mode. This function is invoked each time Windows® creates a process. Patching the SDT function enables the process creation event to be captured. However, enhancements built into more recent versions of Windows® (e.g., Vista®) prevent applications from patching the SDT function.

Another method is to use application programmer interface (API) calls in the Windows® API (e.g., the Win32 API) to detect the creation of a process. For example, the API routines PsSetCreateProcessNotifyRoutine and PsSetLoadImageNotify can be used. This method also has drawbacks, including that notification of process creation from these routines can be too late to stop (or allow) the newly created process from running. In addition, these API calls do not provide the name of the process.

Thus, in certain embodiments, systems and methods are provided for detecting a process creation event that addresses some or all of the above-mentioned problems, among others. The features of these systems and methods will now be described with reference to the drawings summarized above. Throughout the drawings, reference numbers are reused to indicate correspondence between referenced elements. The drawings, associated descriptions, and specific implementations are provided to illustrate embodiments of the inventions and not to limit the scope of the inventions.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined into a single block or state. Moreover, the various modules of the systems described herein can be implemented as software applications, modules, or components on one or more computer systems. While the various modules are illustrated separately, they may share some or all of the same underlying logic or code.

Turning to FIG. 1, an embodiment of a security system 100 for providing control over computer programs is illustrated. In various embodiments, the security system 100 facilitates controlling processes by detecting process creation events. Once a process creation event is detected, the security system 100 can determine what actions to take with respect to the newly created process, such as preventing the process from running, allowing the process to run, or the like.

The illustrated security system 100 includes a monitored system 110, a management server 120 in communication with the monitored system 110, and a management client 130 through which a user can interact with the management server 120. Although only one monitored system 110 is shown, in some implementations, more than one monitored system 110 can be in communication with the management server 120. A group of monitored systems 110 could comprise, for instance, a group of user computers at an organization. A communication medium such as a network (not shown) can be provided as an interface between the management server 120 and the monitored system or systems 110.

In certain embodiments, the monitored system 110 is a client or user computer system. One or more processes 112 can be provided with the monitored system 110. Each process 112 can include an instance of a program opened by the user (a "user process") and/or an instance of a program opened by the operating system (an "operating system process"). User processes 112 can include applications such as web browsers, word processors, registry editors, and the like. In addition, user processes 112 can include programs that can be opened without the user's knowledge, such as spyware or viruses.

A security module 114 is provided on the monitored system 110 in certain embodiments for monitoring and controlling the processes 112. The security module 114 in certain embodiments injects an interceptor 116 into a native operating system process. Native operating system processes include operating system processes running in a user mode, rather than in a kernel mode. In some Windows® implementations, processes running in user mode have limited access to memory and certain sensitive CPU instructions. Processes running in kernel mode, in contrast, can have complete access to memory and CPU instructions. User and kernel modes can also reflect privilege levels of a processor on the monitored system 110. For example, some processors (e.g., Intel® processors) have multiple privilege levels called "Rings," such that user mode can be referred to as "Ring 0," and kernel mode can be referred to as "Ring 3." Advantageously, by injecting into native operating system processes running in user mode, the security module 114 can intercept processes while avoiding the system instability problems caused by using device drivers in kernel mode.

In some Windows® implementations, the security module 114 injects the interceptor 116 into an operating system process by using routines that are native to the Windows® operating system. These native routines are also sometimes referred to as "undocumented" routines. As used herein, the term "routine," in addition to having its broad ordinary meaning, can include procedural routines, object-oriented routines, functions, methods, components, modules, objects, classes, implementations of an API, combinations of the same and the like. Injection of the interceptor 116 using native routines is described in further detail below with respect to FIG. 2.

In certain embodiments, the interceptor 116 includes a library, such as a dynamic-link library, that has routines for detecting the creation of processes 112. For example, the interceptor 116 can comprise one or more modules, programs, scripts, combinations of the same, or the like. The interceptor 116 can detect the creation of the processes 112 as they are created or after they are created. For convenience, however, the remainder of this disclosure refers to the creation of processes 112, "process creation events," "newly created processes," and the like without necessarily specifying whether the intercepting thereof occurs during or after the creation of the processes 112. It will be understood that certain embodiments of the systems and methods described herein can intercept or monitor process creation at any time during or after creation occurs.

The interceptor 116 can detect the creation of new processes 112 in certain embodiments by monitoring the operating system process or processes that the interceptor 116 is injected into. In Windows®, newly created processes 112, threads, or the like can be registered with one or more operating system processes. By monitoring the portions of an operating system process that registers new processes, the interceptor 116 can detect the creation of a process 112. The registration of new processes with the operating system process is discussed in more detail below with respect to FIG. 2.

Once the interceptor 116 has detected the creation of a process 112, the interceptor 116 can obtain information or parameters about the process 112 or program instance. This information can include, for example, the name of the process, a process identifier (PID), a name of the process's executable, the file location where the executable is stored, which process called the process 112, an identifier of a thread of the process, a handle to the process, a handle to a thread of the process, a security or access token of the process, command line parameters, combinations of the same, and the like.

Using the information or parameters obtained about the newly-created process 112, the interceptor 116 can advantageously control the execution of the newly-created process 112 or effects thereof. The interceptor 116 can, for instance, attempt to match the name of the process 112 to a process name listed in a set or list of program names. If the process 112 name matches or corresponds to an identified program name on the list of programs, then the interceptor 116 can perform some action to prevent the process 112 from running, limit the full functionality of the process 112, or conversely, allow the process 112 to run. Alternatively, the interceptor 116 can instead pass the process information to the security module 114, which can attempt to match the name of the process 112 to a program name in a list of programs. The security module 114 can also control the process 112 in place of the interceptor 116 in some embodiments.

The security module 114, in certain implementations, also outputs the process information obtained from the process 112 to the management server 120 for storage and analysis. The management server 120 in some Windows Server® environments can be a domain controller or the like, responsible for security authentication requests from the monitored system 110. The management server 120 can store the data, for instance, in a data storage component 124, which may include a database or the like.

The illustrated management server 120 further includes a policies engine 122 for customizing which programs or processes 112 are to be prevented from running, limited in their functionality, and/or allowed to run. The policies engine 122 can in some embodiments also analyze the data received from the security module 114 to determine user compliance with one or more rules. In some embodiments, a ticket system (not shown) or the like can be provided for tracking and responding to policy violations.

As shown, the security system 100 also includes a management client 130 for interfacing with the management server 120 using a network interface 126. In an embodiment, the management client 130 can be a computer operated by IT personnel, an administrator, a security officer, or the like. The management client 130 can include a user interface 132 and related programs for interacting with the management server 120. The user interface 132 can be used, for example, to obtain and analyze data stored in the data storage component 124 and to modify policies in the policies engine 122.

Figure 2:
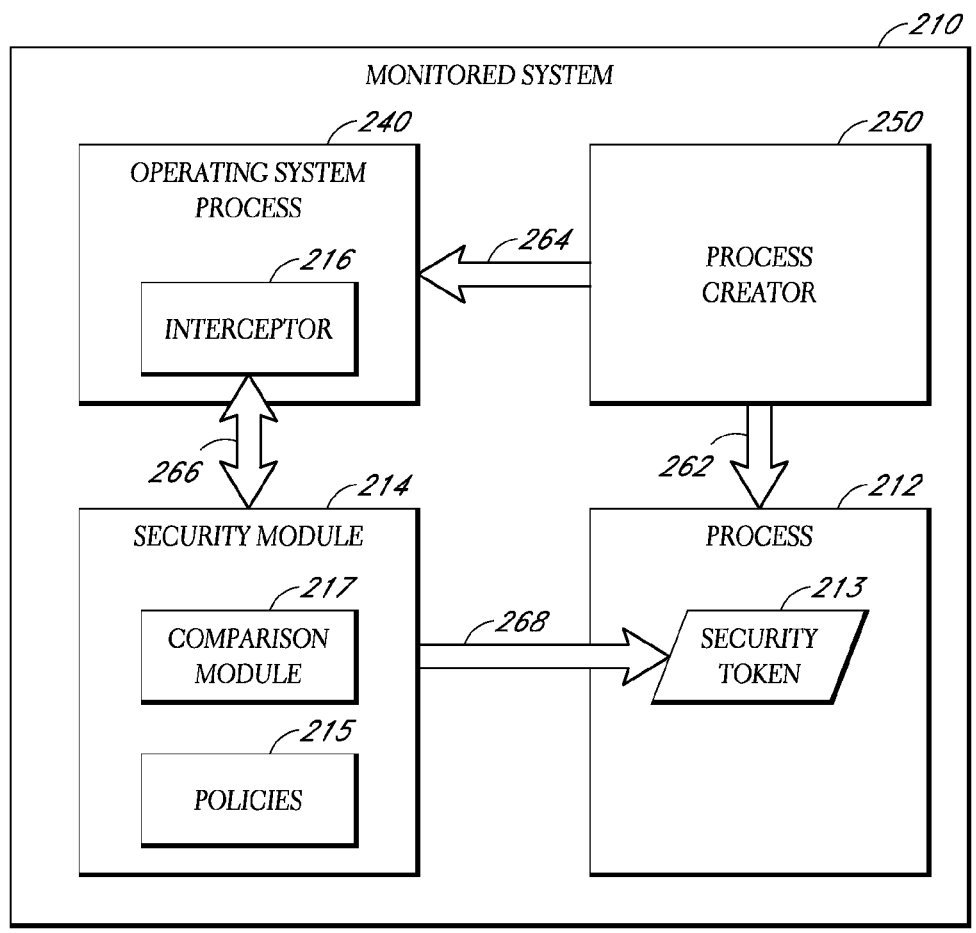
FIG. 2 illustrates an embodiment of a monitored system in accordance with the security system of FIG. 1.

FIG. 2 illustrates a more detailed embodiment of a monitored system 210. Various components are provided with the monitored system 210 that enable detection of process creation events. Like the components of the security system 100, the components of the monitored system 210 can be implemented as software applications, modules, combinations of the same, or the like on one or more computer systems, such as user computer systems.

Certain modules or components from FIG. 1 have counterparts in the monitored system 210, including a process 212, security module 214, and an interceptor 216. The process 212, security module 214, and interceptor 216 can have the same or substantially the same functionality described above with respect to FIG. 1. In addition, new modules or components are shown, including an operating system process 240, a process creator 250, and a security or access token 213.

The process creator 250 is a software program or the like that creates other processes. In certain embodiments, the process creator 250 can be another process, such as a shell program. An example shell program in Windows® is the Windows® Explorer. Examples of shell programs in other operating systems include X Windows for Linux® and Finder for Mac OS® or Mac OS X. Other example shell programs include command line shell programs (e.g., a Disk Operating System (DOS) shell or DOS shell emulator). In certain embodiments, the shell program need not be part of the operating system, but can be a third-party shell program. Additionally, the process creator 250 could also be an application other than a shell program that creates a child process 212 or the like.

In certain embodiments, the process creator 250, during or after creating the process 212, registers the newly created process with one or more operating system processes 240. The operating system process 240 can be a native operating system process 240, such as is described above with respect to FIG. 1. Some of the possible operating system processes 240 that register new processes 212 in certain Windows® systems include the Client/Server Runtime Subsystem Service (csrss.exe) and the Local Security Authority Subsystem Service (lsass.exe). Advantageously, because newly-created user or Win32 processes 212 are registered with one or both of these services in many implementations, the interceptor 216 can obtain process information from these operating system processes 240, as described below. Other Windows® operating system processes 240 that can be used in certain embodiments to detect process creation include the Services process (services.exe), the System Process (system), the Svchost process (svchost.exe), combinations of the same, and the like.

As described above, in certain embodiments the interceptor 216 is a software library or the like injected into the operating system process 240 that can detect the creation of new processes 212. In certain embodiments, the security module 214 is responsible for injecting the interceptor 216 into the operating system process or processes 240. In some Windows® implementations, the security module 214 injects the interceptor 216 into the operating system process 240 by using native Windows® routines. Native Windows® routines are used because, in some implementations, Windows® API injection routines such as CreateRemoteThread cannot be used to inject into operating system processes 240. Example native Windows® routines that can be used include RtlCreateUserThread and NtCreateThread. Advantageously, using the native routines described herein allows the interceptor 216 to be injected into operating system processes 240 across multiple Windows® sessions.

In some implementations, the security module 214 injects the interceptor 216 into the operating system process 240. For example, the security module 214 can use a native routine such as RtlCreateUserThread to inject or write a new thread inside the operating system process 240. In certain embodiments, this thread includes a set of instructions called a "thunk." The security module 214, using the native routine, can write the thunk directly into the memory space allocated to the operating system process 240. The thunk calls a special loader routine (not shown), which can also be written directly into the memory space of the operating system process 240. In one embodiment, the thunk exits the operating system process 240 by calling the ExitProcess routine after calling the loader routine. The loader routine calls a native API routine, such as the LdrLoadLibrary routine, for loading software libraries into a process. This native routine loads the interceptor 216 into the memory space of the operating system process 240. The loader routine can also unload the interceptor 216 if desired or required.

Once the interceptor 216 has been injected into the operating system process 240, the interceptor 216 can obtain information about the newly created process 212. One implementation of the interceptor 216 obtains this information by replacing a memory address of a selected routine (not shown) in the operating system process 240 with an address to an interceptor routine or routines (not shown). This selected routine could be, for instance, a process creation routine, process registration routine, or the like. In addition, the interceptor 216 can replace the addresses of multiple selected routines in some implementations. The address of the selected routine can be in an address table having a set of addresses for routines used by the operating system process. The interceptor routine can be provided with the interceptor 216 or can be provided in a separate software module or library, such as a dynamic-link library (DLL).

More specifically, in certain embodiments the interceptor 216 replaces a memory address in an import table of a library, such as a DLL, that can be linked into the operating system process 240. One example DLL used by the csrss.exe process in some implementations is the basesrv.dll library. In this library is a process creation routine called CsrCreateProcess. This process creation routine can be called by csrss.exe when a new process 212 is registered with csrss.exe. By replacing the address of this process creation routine with the interceptor routine, the interceptor 216 can intercept process information such as routine parameters that would have been sent to the process creation routine. These parameters can include the process information described above, a pointer to the process information described above, combinations of the same, or the like. In an embodiment, the technique of replacing an address in the import table is referred to as "import table hooking."

Once the interceptor 216 has obtained the process information, the interceptor 216 (or the interceptor routine) can return control to the process creation routine. In certain embodiments, the interceptor 216 does this by saving the address of the process creation routine prior to replacing the address and calling the process creation routine at the saved address upon completion of the interceptor routine. Thereafter, the operating system process 240 can proceed to execute normally in certain embodiments without intervention by the interceptor 216 until another new process 212 is created.

Additionally, once the interceptor 216 has obtained the process information, the interceptor 216 can pass some or all of the process information to the security module 214. In certain embodiments, the interceptor 216 passes the process information to the security module 214 using a local procedure call (LPC) service provided by the Windows® kernel. The security module 214 of certain embodiments includes one or more policies 215 that define rules or the like for handling the process information. In certain embodiments, these policies 215 are set or otherwise controlled by the policies engine 122 of the management server 120.

The policies 215 can provide, for instance, that process names that match names of programs appearing in a set of programs of interest, such as a set of programs listed in a blacklist, should be prevented from running. Conversely, the policies 215 can also provide that process names matching names of programs appearing in a whitelist should be allowed to run. Both a blacklist and a whitelist could be used in some implementations. In the illustrated embodiment, a comparison module 217 is provided for comparing the process information, parameters, or the like with the set of predetermined programs according to the policies.

Another example policy 215 can be that process names matching names of programs on a list are allowed to run, but with reduced functionality. For example, a web browser program could be allowed to run but be prevented from visiting certain web sites, such as potentially malicious web sites. Many other policies 215 and uses for the process information could also be provided.

The policies 215 can, in certain embodiments, be customized for different users of the monitored system 210. For example, the security module 214 can determine which user is using the monitored system 210 and apply a certain set of policies 215 based on that determination.

In certain implementations, the security module 214 modifies the execution of the process 212 according to the policies 215. The security module 214 can modify the execution of the process 212 by, for instance, creating a new security token 213 or modifying an existing security token 213 of the process 212. In Windows® and some other systems, a security or access token 213 defines a program's access rights. Access rights can include administrative rights (e.g., local or remote) and non-administrative rights, among others. The security module 214 in some instances can modify the security token 213 by modifying a parameter of the process information.

In some versions of Windows®, many programs without administrative rights cannot be executed or even installed. Thus, in certain implementations, the security module 214 can create a security token 213 with administrative rights or provide administrative rights to an existing security token 213 to allow a user to run the process 212. Conversely, the security module 214 can create a security token 213 or modify an existing security token 213 to provide less than full administrator rights. Moreover, if the process's 212 existing security token 213 (if one exists) has less than full administrator rights, the security module 214 can leave these rights unchanged, thereby preventing the process 212 from running in some instances. The security module 214 can also leave a security token 213 with administrative rights unchanged. Advantageously, the security module 214 therefore can facilitate changing the security settings of individual processes 212 rather than changing the system-wide security settings of a user.

The security module 214 can also pass the process information to a management server, such as the management server 120 of FIG. 1. In addition, the security module 214 can provide alerts to the management server to alert an administrator, IT personnel, or the like of attempted access by a user to a restricted program (e.g., a program listed on a blacklist). Alternatively, the management server can generate the alert in response to receiving the process information.

In other embodiments, the interceptor 216, rather than the security module 214, includes the policies module 215 and/or the comparison module 217. In these embodiments, the interceptor 216 can perform the matching and security token 213 creation functions instead of, or in addition to, the security module 214. The interceptor 216 may still pass the process information to the security module 214 for other purposes in some embodiments. Additionally, the interceptor 216 and the security module 214 can each have policy and/or comparison modules 215, 217 in some embodiments. Thus, the interceptor 216 and the security module 214 can cooperate in certain embodiments to control the execution of the process 212.

In certain additional embodiments, the security module 214 (or the interceptor 216) can take additional steps to secure the newly created process 212 from being used maliciously, as is described in more detail below with respect to FIG. 7. For example, the security module 214 can cause the process 212 to exit or terminate. Thereafter, the security module 214 can create a new process having the parameters of the process 212. As is described in more detail below, replacing the process 212 with a new process can prevent users from maliciously using any administrative rights that might have been provided to the process 212.

Figure 3:
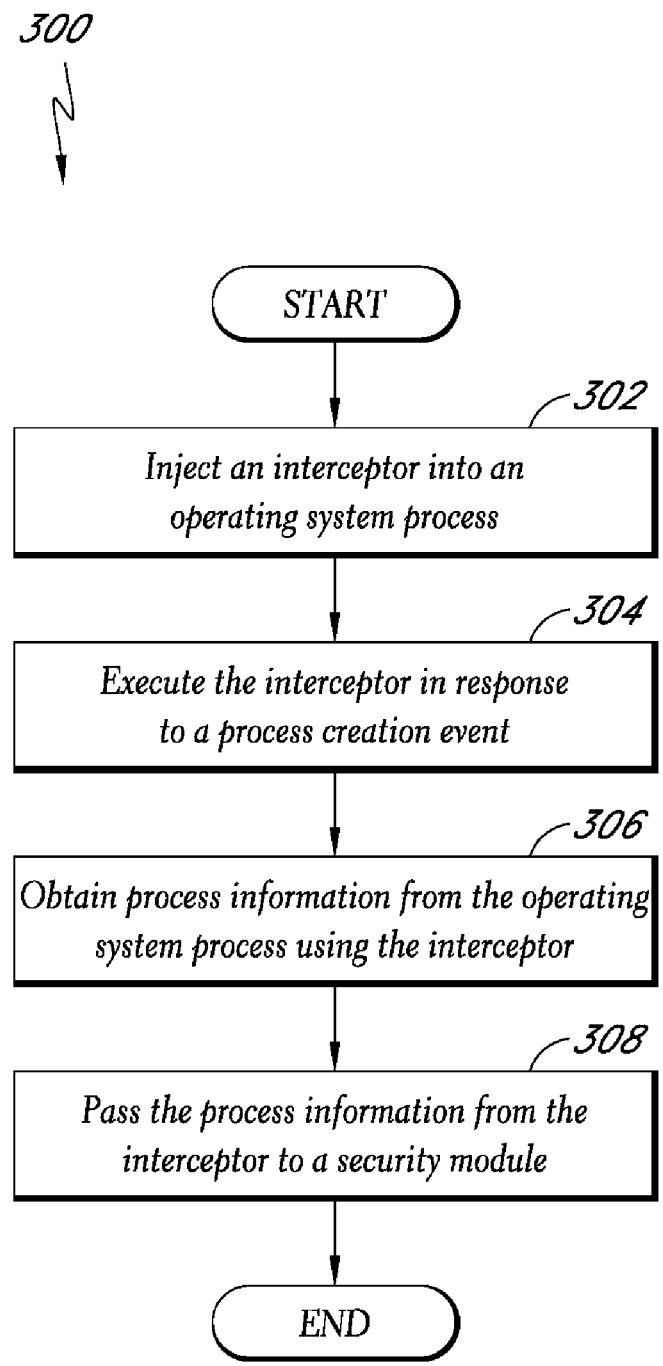
FIG. 3 illustrates an embodiment of a method for detecting process creation events occurring in the monitored system of either FIG. 1 or 2.

FIG. 3 illustrates an embodiment of method 300 for detecting process creation events. In an embodiment, the method 300 may be implemented by any of the systems described above, such as the security system 100 or the monitored system 210, or by components thereof. Advantageously, the method 300 of certain embodiments facilitates detecting process creation events.

Beginning at block 302, an interceptor is injected into an operating system process. This block 302 can be performed by a security module, such as any of the security modules described above. In Windows® implementations, the operating system process can be any of the system processes described above, such as csrss.exe or lsass.exe. In certain implementations, injecting the interceptor into the operating system process includes accessing native operating system routines to inject the interceptor as a thread into the operating system process. In addition, in some embodiments, the interceptor can be injected into multiple operating system processes.

At block 304, the interceptor executes in response to a process creation event. In certain embodiments, this block 304 can include the interceptor replacing an address of a process creation routine of the operating system process with an address of an interceptor routine, as described above with respect to FIG. 2. With the address of the process creation routine replaced, the interceptor routine can be called in response to a process registration or creation request.

At block 306, the interceptor obtains process information from the operating system process. Upon calling of the interceptor routine by the operating system process, the interceptor routine can read parameters passed to the interceptor routine. These parameters in certain embodiments include information about the process.

Continuing, at block 308, in certain embodiments the process information can be passed from the interceptor to a security module. This step may be performed, for example, by the interceptor. The security module can then use the process information to control the process as described above. Or, in alternative embodiments, block 308 may be omitted, and the interceptor can use the process information to control the process.

Figure 4:
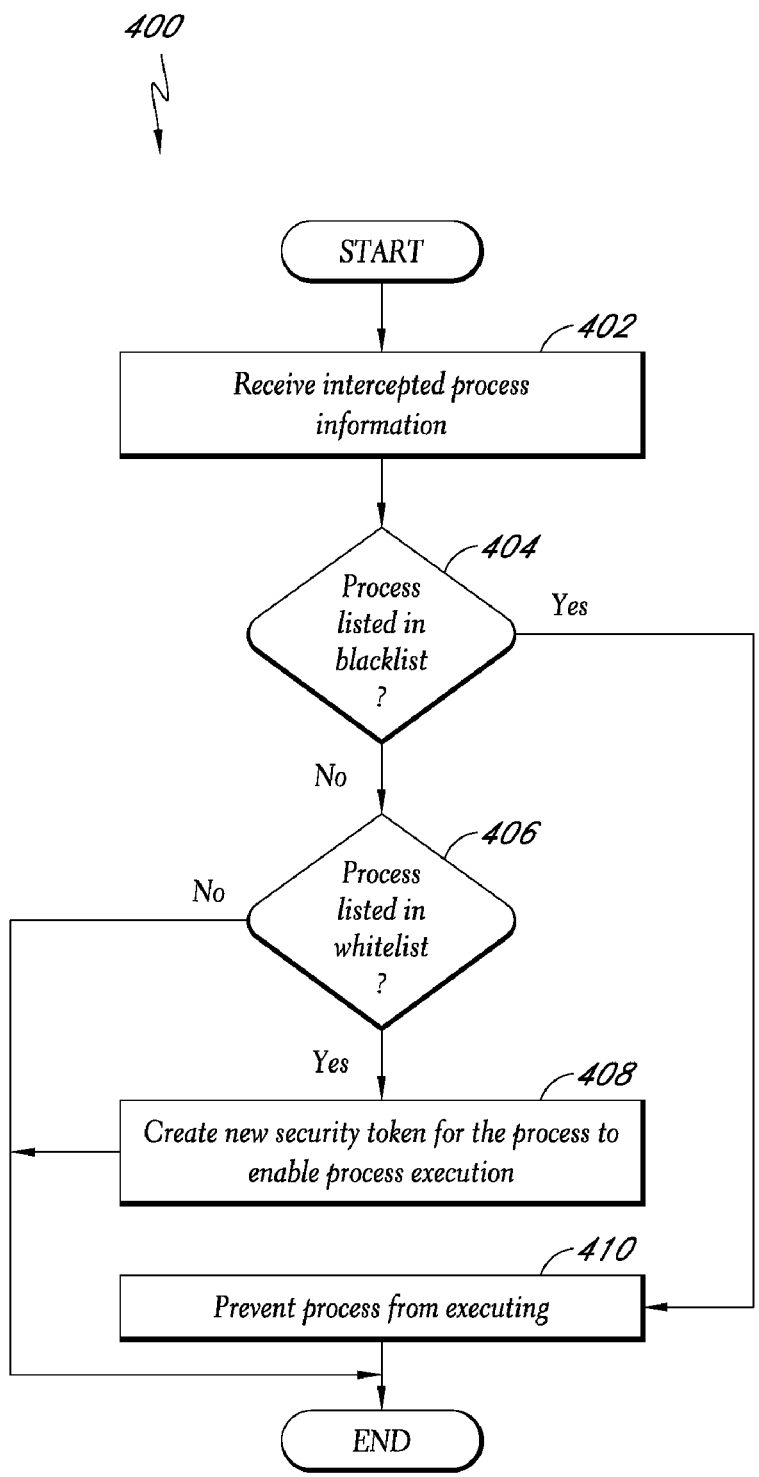
FIG. 4 illustrates an embodiment of a method for controlling a process detected by the method of FIG. 3.

FIG. 4 illustrates an embodiment of a method 400 for controlling a process detected, for example, by the method 300 of FIG. 3. In certain embodiments, the method 400 may be implemented by any of the systems described above, such as the security system 100 or the monitored system 210, or by components thereof. The method can be implemented by any of the security modules and/or interceptors described above.

Beginning at block 402, the method 400 receives intercepted process information. For example, this process information can be intercepted by an interceptor injected into an operating system process. At block 404, it is determined whether the process is listed in a blacklist. This can be determined in one embodiment by comparing the name of the process found in the process information with program names listed on the blacklist. If the process name matches an identified program listed on the blacklist, the process may be prevented from executing at block 410. Alternatively, the process may be allowed to execute, but with reduced functionality.

The process can be prevented from executing in certain implementations by creating a new security token for the process that has non-administrative privileges. In other embodiments, if the process already has non-administrative privileges, the process can be prevented from executing by taking no action. Since the process may already have non-administrative privileges, an operating system such as Windows® may not allow the process to execute in some implementations.

If, at block 404, it is determined that the process is not listed in a blacklist, it is determined whether the process is listed in a whitelist at block 406. If the process is listed in a whitelist, a new security token for the process can be created to enable the process to execute at block 408. This new security token can be given, for example, administrative privileges. If the process is not listed in the whitelist, however, no action may be taken, or alternatively, the process can be prevented from executing as is done at block 410.

In alternative embodiments of the method 400, one of blocks 404 and 406 can be removed, such that a blacklist or whitelist is used, but not both.

Figure 5:
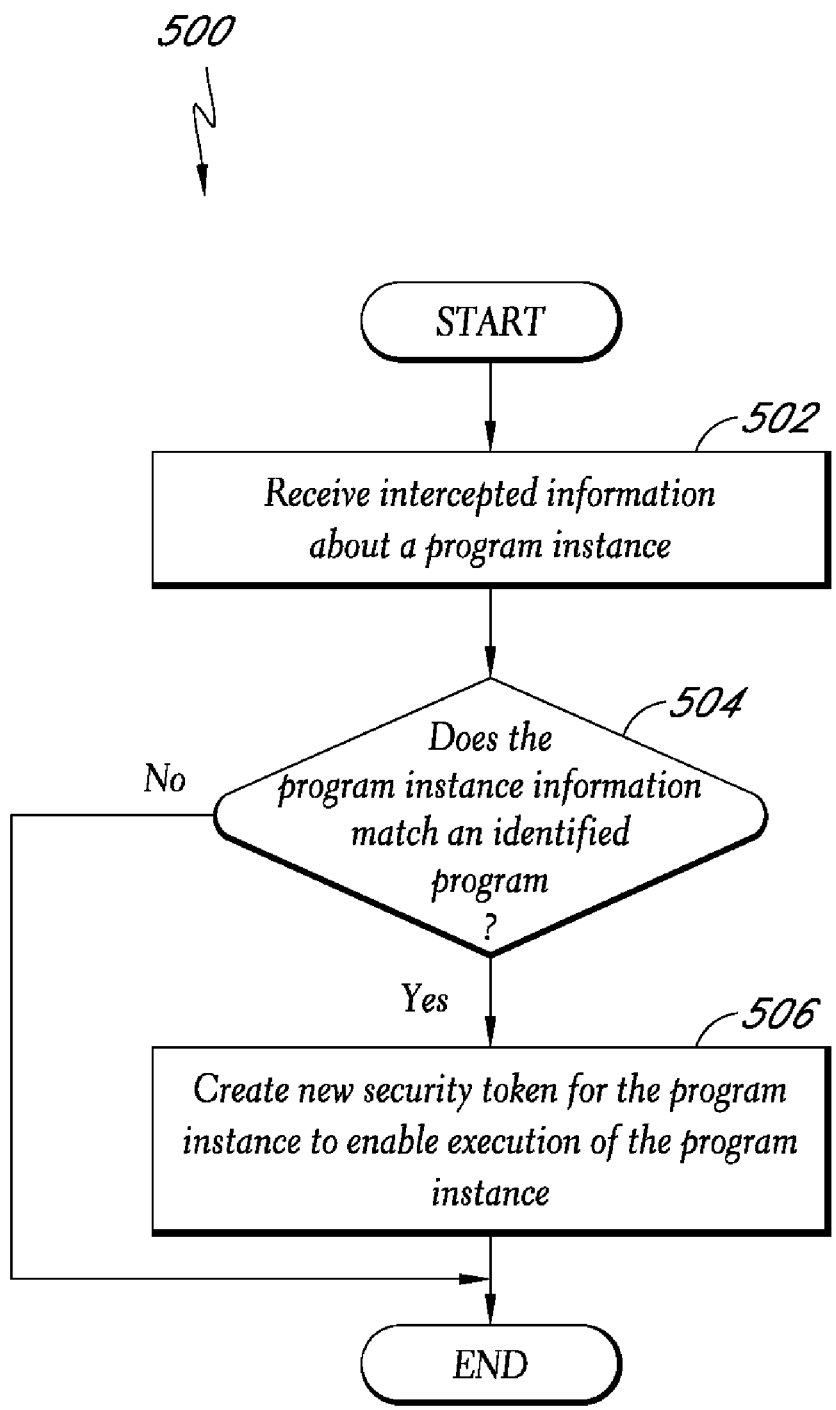
FIG. 5 illustrates another embodiment of a method for controlling a process detected by the method of FIG. 3.

FIG. 5 illustrates another embodiment of a method 500 for controlling a program instance detected, for example, by the method 300 of FIG. 3. In certain embodiments, the method 500 can be implemented by any of the systems described above, such as the security system 100 or the monitored system 210, or by components thereof. In particular, any of the security modules or interceptors described above can be used to implement the method 500.

At block 502, intercepted program instance information is received, for example, from an interceptor injected into an operating system process. This information can include, for example, the name of the intercepted program instance, a program instance identifier (PID), a name of the program instance's executable, the file location where the executable is stored, which process called the program instance, an identifier of a thread of the program instance, a handler to the program instance, a handler to a thread of the program instance, a security token of the program instance, combinations of the same, and the like.

At block 504, it is determined whether the program instance information matches an identified program name. If so, a new security token is created for the program instance at block 506 to enable the program instance to execute, similar to block 408 of the method 400 described above. Otherwise, the method 500 ends, such that the program instance keeps its current security token. Alternatively, the program instance can be prevented from executing by creating a new security token with non-administrative privileges or the like.

Figure 6:
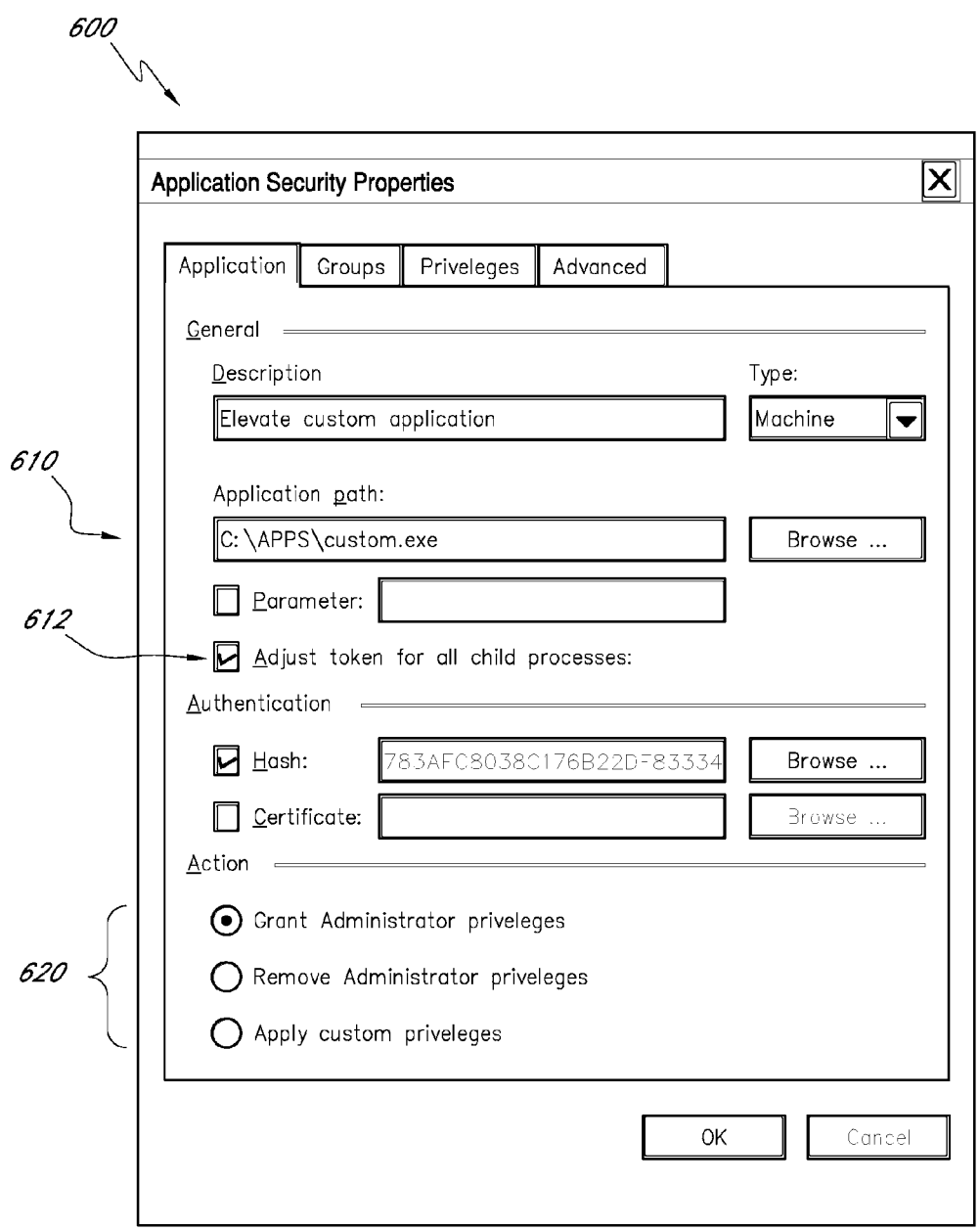
FIG. 6 illustrates an example user interface for controlling processes.

FIG. 6 illustrates an example user interface 600 for controlling program instances such as processes, threads, fibers, combinations of the same, or the like. The user interface 600 of certain embodiments can be implemented as the user interface 132 or a portion thereof on the management client 130 of FIG. 1. Alternatively, the user interface 600 can be implemented directly on any of the monitored systems described above.

The example user interface 600 includes a text box 610 for entering the name of a program or application. The application listed in the example text box 610 is a "custom" application, with filename "custom.exe". When loaded into memory, in certain embodiments the custom.exe program can become the custom.exe process.

Options 620 are provided for adjusting the application's security token. Three options 620 are shown, including granting administrator privileges to the program, removing administrator privileges, and applying custom privileges. Some example custom privileges include a privilege or ability to backup files, a privilege to load device drivers, a privilege to take ownership of objects such as files (e.g., to change permissions of a file, access a printer, or the like), combinations of the same, and the like. Additionally, option 612 is provided for adjusting the security token of all child processes created from the custom.exe process. Options 612, 620 therefore advantageously enable an administrator, IT personnel, or the like to set a policy for individual applications.

While options for setting policies for one application are shown, in other embodiments user interfaces can be provided for setting policies for multiple applications. For example, a user interface could provide the ability to customize categories of applications. Many other configurations of user interfaces are also possible.

Figure 7:
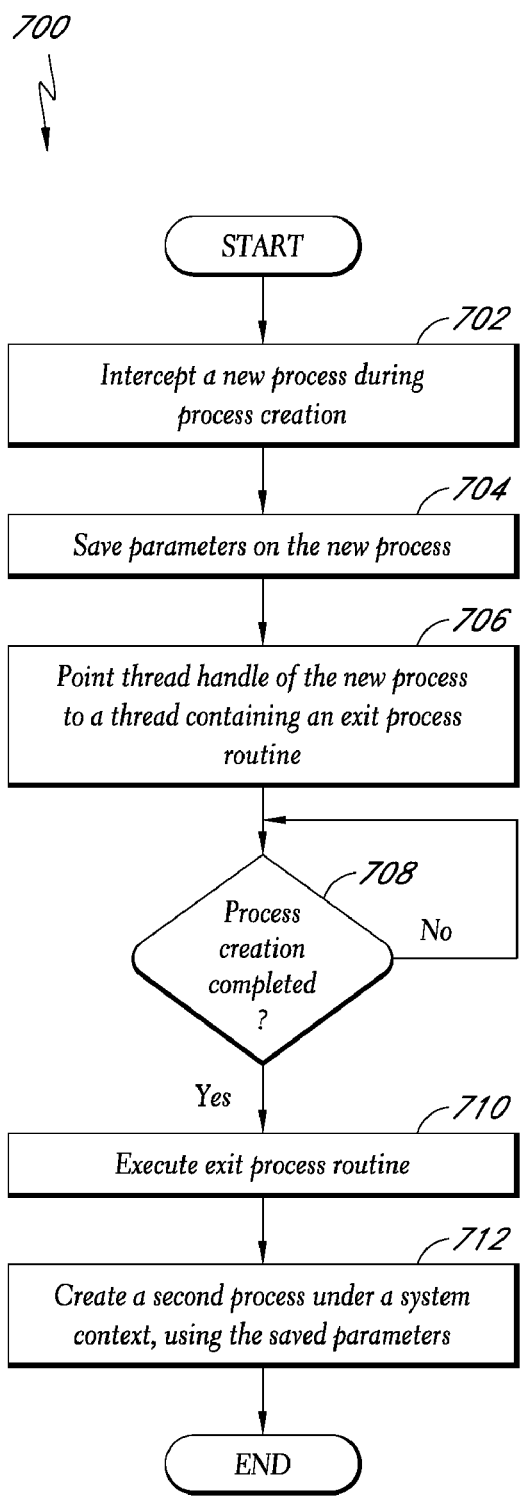
FIG. 7 illustrates an embodiment of a method for securing a program instance detected by the method of FIG. 3.

FIG. 7 illustrates an embodiment of a method 700 for securing a program instance detected, for example, by the method 300 of FIG. 3. In certain embodiments, the method 700 can be implemented by any of the systems described above, such as the security system 100 or the monitored system 210, or by components thereof.

In certain implementations, modifications to a newly-created process by a security module, interceptor, or the like can result in the modified process getting more permissions than the originally launched process, up to having full administrative privileges. Modifying the process can therefore cause a user who launched the original process to effectively become an owner of the modified process with administrative privileges. This happens because in some implementations of Windows®, a "process handle" object is created for each new process. This handle has an access mask associated with it to determine which users can do which operations with the handle (e.g., read, write or the like). The user who created a process, however, can receive full access rights to the handle of the process.

Full access to the process handle can allow the user to perform virtually any operation on the modified process including creating a new (child) thread. The user can include malicious code in this new thread, which can be used to harm the monitored system and even take the computer over completely. This is true even if the user who started the process is a limited user.

Therefore, in certain embodiments, the method 700 is provided for overcoming or reducing the effects of these and other problems. At block 702, a new process is intercepted during creation of the new process. This block 702 may be performed, for example, by any of the interceptors described above. Block 702 can further include modifying the parameters of the new process or creating new parameters for the new process, as described above. Once the new process is intercepted, at block 704, the parameters of the new process are saved. This block 702 can be performed by any of the interceptors or security modules described above.

Thereafter, the new process is shut down in blocks 706 through 710. Specifically, at block 706, a thread handle of the new process is pointed to a thread containing an exit process routine. For example, the main thread handle of the new process can be set to point to a thread in an interceptor, security module, library, or the like containing the exit process routine. In certain Windows® implementations, the exit process routine is the ExitProcess function in the Windows API.

Thereafter, it is determined at block 708 whether creation of the process has completed. If not, the method 700 loops at block 708 in certain embodiments until the process has been fully created. Once the process has been created, at block 710 the exit process routine is executed, effectively causing the new process to shut down.

Continuing at block 712, a second process is created under a system context or account, rather than under the user account that created the first (new) process. This second process is created using the parameters saved at block 704. In certain embodiments, this block 712 can be performed by an interceptor or security module. The system context can be a LOCAL SYSTEM context or account in some Windows® implementations. The system account receives full access rights to the handle of the second process because the system account created the second process. In contrast, the user does not receive full access rights because the user did not start the second process. As a result, in certain embodiments the second process cannot be used maliciously by a user.

In certain embodiments, the parameters of the new process are modified at block 702 even though the new process will be terminated at block 710. Modification in this manner can be performed on some systems, such as Windows Vista® systems, to achieve compatibility with certain third party tools such as Vista's User Account Controls or the like. Alternatively, some or all of the parameters of the new process are not modified, but the parameters of the second process are modified instead.

Each of the methods, components, and algorithms described above may be embodied in, and fully automated by, code modules executed by one or more computers or computer processors. The code modules may be stored on any type of computer-readable medium or computer storage device. The methods and algorithms may also be implemented partially or wholly in application-specific circuitry. The results of the disclosed methods and method blocks may be stored, persistently or otherwise, in any type of computer storage. In one embodiment, the code modules may advantageously be configured to execute on one or more processors. In addition, the code modules may comprise, but are not limited to, any of the following: software or hardware components such as software object-oriented software components, class components and task components, methods, functions, attributes, procedures, subroutines, segments of program code, drivers, firmware, microcode, circuitry, data, databases, data structures, tables, arrays, variables, or the like.

The various features and methods described above may be used independently of one another, or may be combined in various ways. All possible combinations and subcombinations are intended to fall within the scope of this disclosure. In addition, certain method blocks may be omitted in some implementations.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A computer-implemented method of detecting creation of processes, the method comprising:
   injecting an interceptor module into a native operating system process responsible for process creation;
   said injecting comprising replacing, with the interceptor module, an address of a selected routine in an address table with an address to an interceptor routine of the interceptor module such that the native operating system process is configured to call the interceptor routine in place of the selected routine, wherein the address table is an import table of a software library configured to be linked into the native operating system process;
   detecting, with the interceptor routine, creation of a new process by the native operating system process;
   in response to said detecting creation of the new process, obtaining at least one parameter from the native operating system process using the interceptor routine, wherein the at least one parameter comprises a name of the new process;
   analyzing the at least one parameter to determine whether the name of the new process corresponds to a program that is to be controlled based on a user-defined policy; and
   controlling the new process in response to determining that the new process is to be controlled based on the user-defined policy, wherein said controlling comprises:
      saving the at least one parameter,
      causing the new process to terminate to thereby prevent the new process from executing, and
      automatically creating, with a system account, a third process having the at least one parameter, thereby enabling the system account to receive full access rights to the third process instead of a user who started the new process having the full access rights, thereby preventing the user from being able to create a malicious child thread from the third process.

2. The method of claim 1, wherein the native operating system process is a Client/Server Runtime Subsystem Service (csrss.exe) process in a Microsoft Windows® operating system.

3. The method of claim 1, wherein the native operating system process is a Local Security Authority Subsystem Service (lsass.exe) process in a Microsoft Windows® operating system.

4. The method of claim 1, wherein controlling the second process comprises creating a security token for the second process.

5. The method of claim 4, wherein creating the security token for the second process comprises providing non-administrator access rights to the security token.

6. The method of claim 1, wherein the address table is an import table of a software library configured to be linked into the native operating system process.

7. The method of claim 1, wherein obtaining the at least one parameter comprises reading at least one routine parameter passed into the interceptor routine.

8. The method of claim 1, wherein analyzing at least one parameter comprises comparing a name of the process to a whitelist of program names.

9. The method of claim 1, wherein the interceptor module analyzes the at least one parameter.

10. The method of claim 1, wherein the interceptor module controls the second process.

11. The method of claim 1, further comprising receiving the user-defined policy from a management server remote to a computing device comprising the native operating system process and the interceptor module, the user-defined policy providing rules for controlling the new process.

12. The method of claim 1, wherein the method is implemented by a computer system comprising computer hardware.

13. The method of claim 12, wherein the computer system comprises a plurality of computing devices.

14. A system for detecting creation of a program instance, the system comprising:
   a computer hardware within a computer system, the computer system configured to implement;
      an interceptor module configured to be injected into a native operating system process responsible for creating program instances, the interceptor module further configured to replace an address of a selected routine in an address table with an address of an interceptor routine, such that the native operating system process calls the interceptor routine in place of the selected routine during creation of the program instance, the interceptor routine configured to detect creation of a program instance and to obtain a name of the program instance in response to detecting creation of the program instance;
      a comparison module configured to compare the name of the program instance to a set of identified programs to determine whether the program instance corresponds to at least one of the identified programs; and
      a security module configured to modify execution of the program instance based at least in part on a determination that the program instance corresponds to at least one of the identified programs, wherein the security module is configured to:
         save the name of the program instance,
         halt execution of the program instance, and
         automatically create, with a system account, a new program instance having the name of the program instance, thereby enabling the system account to receive full access rights to the new program instance instead of a user who started the program instance having the full access rights, thereby preventing the user from being able to create a malicious child thread from the new program instance;
      wherein the interceptor module, the comparison module, and the security module are implemented by the computer system comprising computer hardware.

15. The system of claim 14, wherein the native operating system process is a Client/Server Runtime Subsystem Service (csrss.exe) process in a Microsoft Windows® operating system.

16. The system of claim 14, wherein the native operating system process is a Local Security Authority Subsystem Service (lsass.exe) process in a Microsoft Windows® operating system.

17. The system of claim 14, wherein the security module comprises the comparison module.

18. The system of claim 14, wherein the interceptor module comprises the comparison module.

19. The system of claim 14, wherein the security module is further configured to inject the interceptor module into the native operating system process.

20. The system of claim 14, wherein the security module is further configured to create a security token for the program instance in response to determining that the program instance corresponds to at least one of the identified programs.

21. The system of claim 14, wherein the interceptor module is further configured to:
  store the address of the selected routine prior to replacing the address of the selected routine in the address table with the address of the interceptor routine; and
  restore the address of the selected routine to the address table upon completion of the interceptor routine.

22. The system of claim 14, further comprising a management server in network communication with a computing device executing the native operating system process, the management server further comprising policies providing rules for modifying execution of the program instance.

23. The system of claim 22, wherein the security module is further configured to receive the policies from the management server.

24. Non-transitory physical computer storage comprising computer-executable instructions stored thereon that, when executed by one or more processors, are configured to implement components for detecting creation of a program instance, the components comprising:
  an interceptor module configured to be injected into a native operating system process responsible for creating program instances, the interceptor module further configured to replace an address of a selected routine in an address table with an address of an interceptor routine, such that the native operating system process calls the interceptor routine in place of the selected routine during creation of the program instance, the interceptor routine configured to detect creation of a program instance and to obtain a name of the program instance in response to detecting creation of the program instance;
  a comparison module configured to compare the name of the program instance to a set of identified programs to determine whether the program instance corresponds to at least one of the identified programs; and
  a security module configured to modify execution of the program instance based at least in part on a determination that the program instance corresponds to at least one of the identified programs, wherein the security module is configured to:
  save the name of the program instance,
  halt execution of the program instance, and
  automatically create, with a system account, a new program instance having the name of the program instance, thereby enabling the system account to receive full access rights to the new program instance instead of a user who started the program instance having the full access rights, thereby preventing the user from being able to create a malicious child thread from the new program instance.

25. The non-transitory physical computer storage of claim 24, wherein the components further comprise a management server comprising functionality for a user to define a policy providing rules for execution of the program instance.

26. The non-transitory physical computer storage of claim 24, wherein the security module is further configured to access the policy from the management server and perform said modification of the execution of the program instance based on the policy.

27. The non-transitory physical computer storage of claim 24, in combination with a computer system comprising computer hardware.

* * * * *

UNITED STATES PATENT AND TRADEMARK OFFICE
CERTIFICATE OF CORRECTION

| | | |
|---|---|---|
| PATENT NO. | : 8,127,316 B1 | Page 1 of 1 |
| APPLICATION NO. | : 11/947695 | |
| DATED | : February 28, 2012 | |
| INVENTOR(S) | : Alessandro Binotto et al. | |

It is certified that error appears in the above-identified patent and that said Letters Patent is hereby corrected as shown below:

Title page (Item 63), Line 22, Under Related U.S. Application Data insert

-- U.S. Provisional Application No. 60/872,034, filed November 30, 2006. --.

Column 3, Line 11, Change ""Windows*")." to -- "Windows®"). --.

Column 3, Lines 34-35, Change "PsSetLoadlmageNotify" to -- PsSetLoadImageNotify --.

Signed and Sealed this

Seventh Day of August, 2012

David J. Kappos
*Director of the United States Patent and Trademark Office*